US012548591B1

(12) United States Patent
Liu et al.

(10) Patent No.: US 12,548,591 B1
(45) Date of Patent: Feb. 10, 2026

(54) MAGNETIC DEVICE UTILIZING SILICON BASED SPIN-TO-CHARGE OR CHARGE-TO-SPIN CONVERSION LAYER

(71) Applicant: Western Digital Technologies, Inc., San Jose, CA (US)

(72) Inventors: Jinming Liu, San Jose, CA (US); Howard G. Zolla, Los Gatos, CA (US); Jennifer L. Grab, San Jose, CA (US); Goncalo Marcos Baião De Albuquerque, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/960,601

(22) Filed: Nov. 26, 2024

(51) Int. Cl.
| | |
|---|---|
| *G11B 5/37* | (2006.01) |
| *G11B 5/012* | (2006.01) |
| *G11B 5/31* | (2006.01) |
| *G11C 11/16* | (2006.01) |
| *H10N 50/85* | (2023.01) |
| *H10N 52/85* | (2023.01) |

(52) U.S. Cl.
CPC ............. *G11B 5/372* (2013.01); *G11B 5/012* (2013.01); *G11B 5/3116* (2013.01); *G11C 11/161* (2013.01); *H10N 50/85* (2023.02); *H10N 52/85* (2023.02)

(58) Field of Classification Search
CPC ... G11B 2005/0021; G11B 5/54; G11B 5/314; G11B 5/3133; G11B 5/3188; G11B 5/09
USPC .......................................................... 360/59
See application file for complete search history.

(56) References Cited

U.S. PATENT DOCUMENTS

| | | | |
|---|---|---|---|
| 9,099,119 | B2 | 8/2015 | Mihajlovic et al. |
| 9,947,347 | B1 | 4/2018 | Van Der Heijden et al. |
| 10,720,570 | B2 | 7/2020 | Le et al. |
| 11,489,108 | B2 * | 11/2022 | Le ........................ H01F 10/3272 |
| 2020/0341079 | A1 | 10/2020 | Swerts et al. |

(Continued)

FOREIGN PATENT DOCUMENTS

JP          7350363 B2      9/2023

OTHER PUBLICATIONS

Cheng-Hsiang Hsu, Julie Karel, Niklas Roschewsky et al. Large spin-orbit torque generated by amorphous iron silicide, Sep. 16, 2022, Preprint (Version 1) available at Research Square [https://doi.org/10.21203/rs.3.rs-1946953/v1].

(Continued)

*Primary Examiner* — Nabil Z Hindi
(74) *Attorney, Agent, or Firm* — Patterson + Sheridan, LLP

(57) ABSTRACT

A read head having a spin-to-charge or charge-to-spin sensing layer comprising amorphous materials, e.g. FeSi or CoSi, omits the need for a crystalline seed layer. Unlike many other material candidates (e.g., BiSb, YBiPt), amorphous sensing layers do not require crystalline seed layers for growth and still exhibit adequate signal. Since seed layers are no longer needed for growth, signal shunting from the seed layer is eliminated and read heads having bottom and top structures may be more easily designed. Furthermore, FeSi and CoSi have increased thermal stability over most material candidates for sensing layers. Accordingly, amorphous sensing layers, such as FeSi or CoSi, are better suited to survive the annealing process of read heads. Thus, the use of FeSi or CoSi, in the sensing layer, results in a better performing, customizable, thermally stable read head.

25 Claims, 6 Drawing Sheets

(56) References Cited

U.S. PATENT DOCUMENTS

| | | |
|---|---|---|
| 2021/0119117 A1 | 4/2021 | Kim et al. |
| 2022/0029090 A1 | 1/2022 | Cho et al. |
| 2022/0052109 A1 | 2/2022 | Chen et al. |
| 2024/0032437 A1 | 1/2024 | Le et al. |
| 2024/0112840 A1 | 4/2024 | Okamura et al. |

OTHER PUBLICATIONS

Qi-Gao Zhu, Hiroshi Iwasaki, Ellen D. Williams, Robert L. Park; Formation of iron silicide thin films. J. Appl. Phys. Oct. 1, 1986; 60 (7): 2629-2631. https://doi.org/10.1063/1.337136.

Khang, N.H.D., Ueda, Y. & Hai, P.N. A conductive topological insulator with large spin Hall effect for ultralow power spin-orbit torque switching. Nature Mater 17, 808-813 (2018). https://doi.org/10.1038/s41563-018-0137-y.

Takanori Shirokura, Pham Nam Hai; Giant spin Hall effect in half-Heusler alloy topological semimetal YPtBi grown at low temperature. AIP Advances Dec. 1, 2022; 12 (12): 125116. https://doi.org/10.1063/5.0117613.

Takanori Shirokura, Nguyen Huynh Duy Khang, Pham Nam Hai; High-efficient spin orbit torque generated by topological semimetal YPtBi deposited on oxidized Si substrates. Appl. Phys. Lett. Jan. 29, 2024; 124 (5): 052402. https://doi.org/10.1063/5.0185917.

Jason Hsu, Large Spin Orbit Torque, UC Berkeley, TMRC 2023.

\* cited by examiner

MAGNETIC DEVICE UTILIZING SILICON BASED SPIN-TO-CHARGE OR CHARGE-TO-SPIN CONVERSION LAYER

BACKGROUND OF THE DISCLOSURE

Field of the Disclosure

Embodiments of the present disclosure generally relate to magnetic recording devices comprising a read head.

Description of the Related Art

The volume of data processed by a computer is increasing rapidly. To keep up with the volume of data processed, the storing and writing of data to a data storage device, such as a hard disk drive (HDD), must improve to adequately handle the volume of data. There is a need for higher recording density of a magnetic recording medium of the storage device to increase the function and the capability of a computer, and to continue processing the high volumes of data.

In order to achieve higher recording densities, such as recording densities exceeding 2 Tbit/in$^2$ for a magnetic recording medium, the width and pitch of data tracks are reduced, and thus the corresponding magnetically recorded bits encoded in each data track are narrowed. That is, as the aerial density of HDDs increases, a smaller read back element is required. There have been many proposals, which attempt to achieve small read back elements in both the down-track and cross-track directions.

As linear density increases, there is a natural tradeoff between resolution and signal-to-noise ratio (SNR), where either the SNR or the resolution suffers as the other increases. As track pitch decreases and the number of tracks-per-inch (TPI) increases, similar issues arise. Narrower devices, which are required to read narrow tracks, generally have inferior SNR to wider devices.

Therefore, there is a need in the art for an improved read head capable of reading data with an improved SNR and recording density.

SUMMARY OF THE DISCLOSURE

A read head having a spin-to-charge (SCC) or charge-to-spin (CSC) conversion layer (from this point forward referred to as a "sensing layer") comprising amorphous materials, e.g. FeSi or CoSi, omits the need for crystalline seed layers. Unlike other material candidates (e.g., BiSb, YBiPt), amorphous FeSi and CoSi do not require crystalline seed layers for growth, while still exhibiting adequate SCC and CSC efficiency. Since seed layers are no longer needed for growth, signal shunting from conductive seed layers is eliminated and read heads may be designed with the sensing layer on either the top (as defined in paragraph [0008] of the specification) or bottom of the sensor stack (as defined in paragraph [0007] of the specification). Furthermore, FeSi and CoSi have increased thermal stability over other materials used in sensing layers. Accordingly, amorphous sensing layers, such as FeSi or CoSi, are better suited to survive the annealing processes, which are common in the fabrication of read heads. Thus, the use of FeSi or CoSi, in the sensing layer, results in a better performing, customizable, thermally stable read head.

In one embodiment, a magnetic device includes a lead; a sensing layer disposed over the lead, wherein the sensing layer comprises a silicon-containing amorphous material; a free layer; and a cap layer, wherein the free layer is disposed between the sensing layer and the cap layer.

In another embodiment, a magnetic device includes a lead; a free layer disposed on the lead; a sensing layer, the sensing layer comprises a silicon-containing amorphous material, and the magnetic device is either: a current-perpendicular-to-the-plane (CPP) spin-to-charge device, wherein a voltage signal generated by the sensing layer, or a current-in-plane (CIP) charge-to-spin device, wherein a voltage signal generated by the sensing layer; and a cap layer, wherein the sensing layer is disposed between the free layer and the cap layer.

In yet another embodiment, a magnetic recording device includes means for reading data disposed at a media facing surface (MFS), the means for reading data comprising: a lead; a sensing layer disposed over the lead, wherein the sensing layer comprises amorphous FeSi, amorphous CoSi, or a combination thereof, has a thickness between 5 nanometers (nm) and 40 nm; and a ferromagnetic layer disposed between the sensing layer and a cap layer, wherein the cap layer is disposed over the ferromagnetic layer; and means for generating a voltage.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A read head having a sensing layer comprising amorphous materials, e.g. FeSi or CoSi, omits the need for crystalline seed layers. Unlike other sensing layers such as topological insulators such as BiSb or YBiPt, amorphous sensing layers do not require crystalline seed layers for growth and still exhibit adequate SCC and CSC efficiencies. Since seed layers are no longer needed for growth, signal shunting from seed layers are eliminated and read heads having the sensing layer underneath or on top of the free layer may be more easily designed. Furthermore, FeSi and CoSi have increased thermal stability over other materials used in sensing layers, such as BiSb topological insulators. Accordingly, amorphous sensing layers, such as FeSi or CoSi, are better suited to survive the annealing process of read heads. Thus, the use of FeSi or CoSi in the sensing layer, results in a better performing, customizable, thermally stable read head.

Figure 1:
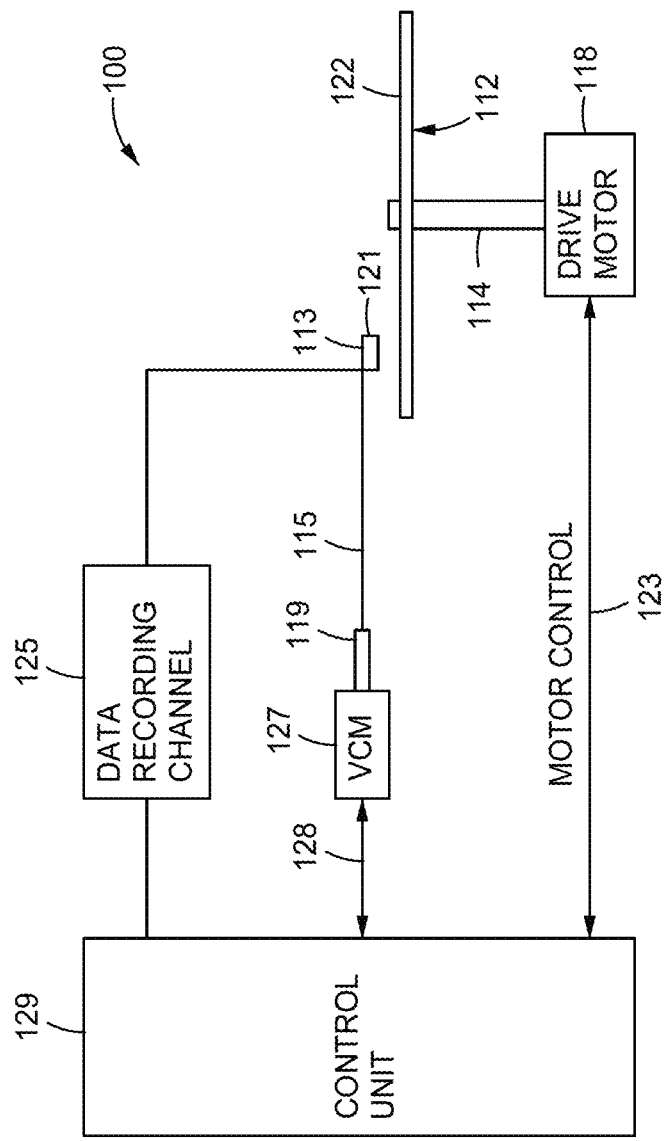
FIG. 1 is a schematic illustration of certain embodiments of a magnetic drive including a read/write head.

FIG. 1 is a schematic illustration of certain embodiments of a magnetic drive 100 including a read/write head. Such a magnetic media drive may comprise a single disk and head or multiples thereof. For the sake of illustration, a disk drive containing one disk 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that optionally include a four-terminal read head. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force, which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

The various components of the disk drive 100 are controlled in operation by control signals generated by control unit 129, such as access control signals and internal clock signals. Typically, the control unit 129 comprises logic control circuits, storage means and a central processing unit (CPU). The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
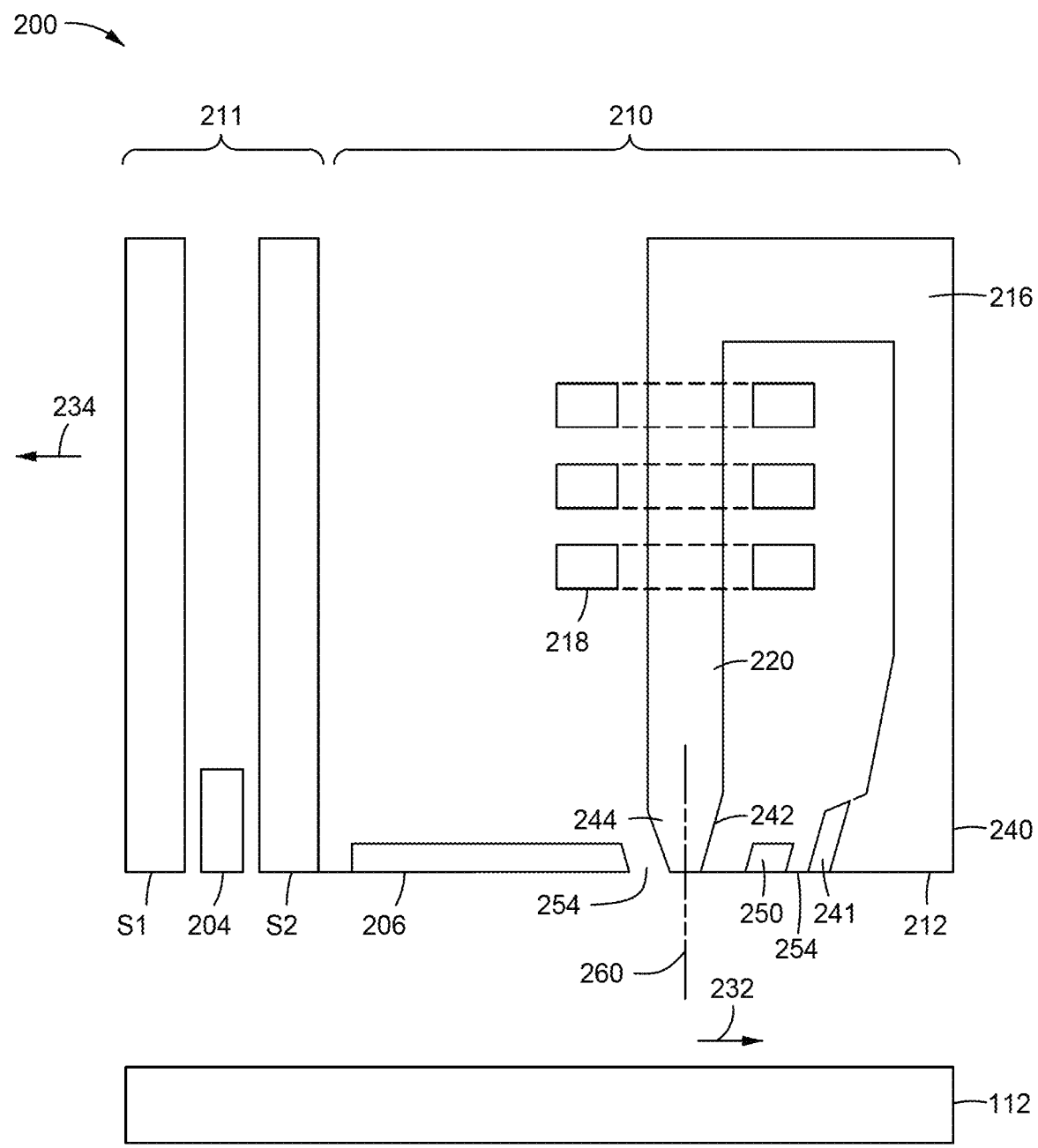
FIG. 2 is a fragmented, cross-sectional side view of certain embodiments of a read/write head.

FIG. 2 is a fragmented, cross-sectional side view of certain embodiments of a read/write head 200. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between shields S1 and S2. In yet another embodiment, the magnetic read head 211 is a SCC or CSC device between shields S1 and S2. The magnetic fields of the adjacent magnetized regions of the magnetic disk 112 are detectable by the MR, MTJ, SCC or CSC sensing element 204 as the recorded bits.

The write head 210 includes a main pole 220, a leading shield 206, a trailing shield 240, an optional spin torque oscillator (STO) device 250, and a coil 218 that excites the main pole 220. The coil 218 may have a "pancake" structure which winds around a back-contact between the main pole 220 and the trailing shield 240, instead of a "helical" structure shown in FIG. 2. When included, e.g., to achieve a Microwave Assisted Magnetic Recording (MAMR) effect, the STO device 250 is formed in a gap 254 between the main pole 220 and the trailing shield 240. Alternatively, 250 could be a conductive layer or other magnetic-based stack that provides an assistive effect for the main pole 220.

In certain embodiments, the read/write head 200 additionally includes mechanisms (not shown) for supporting Heat Assisted Magnetic Recording (HAMR), which may include a waveguide coupled to a light source and a near field transducer (NFT) placed adjacent to the main pole 220 and coupled to the waveguide to convert the delivered light into a heating spot on the media. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a NiFeCo alloy. The leading shield 206 and the trailing shield 240 may be a magnetic material, such as a NiFeCo alloy.

FIGS. 3A-6B illustrate various read heads 300A, 300B, 400A, 400B, 500A, 500B, 600A, and 600B according to various embodiments. Each read head 300A, 300B, 400A, 400B, 500A, 500B, 600A, and 600B may individually correspond to, or be a part of, the magnetic head assembly 121 described in FIG. 1. Each read head 300A, 300B, 400A, 400B, 500A, 500B, 600A, and 600B may individually correspond to, or be a part of, the read/write head 200 described in FIG. 2, such as the magnetic read head 211. Each read head 300A, 300B, 400A, 400B, 500A, 500B, 600A, and 600B may utilize SCC or CSC effects including, but not limited to, the inverse spin Hall effect, the direct spin Hall effect, inverse orbital Hall effect, anomalous Nernst effect, or the anomalous Hall effect. Aspects of the read heads 300A, 300B, 400A, 400B, 500A, 500B, 600A, and 600B may be used in combination with one another.

Figure 3A:
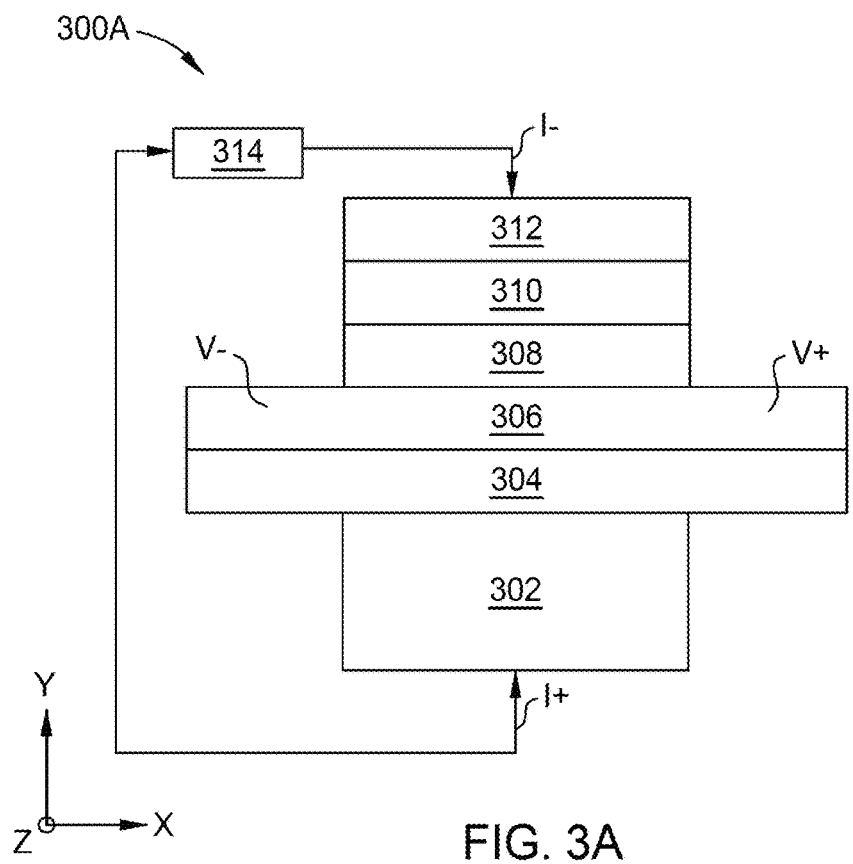
FIG. 3A illustrates a media facing surface (MFS) view of a read head, according to one embodiment.
Figure 3B:
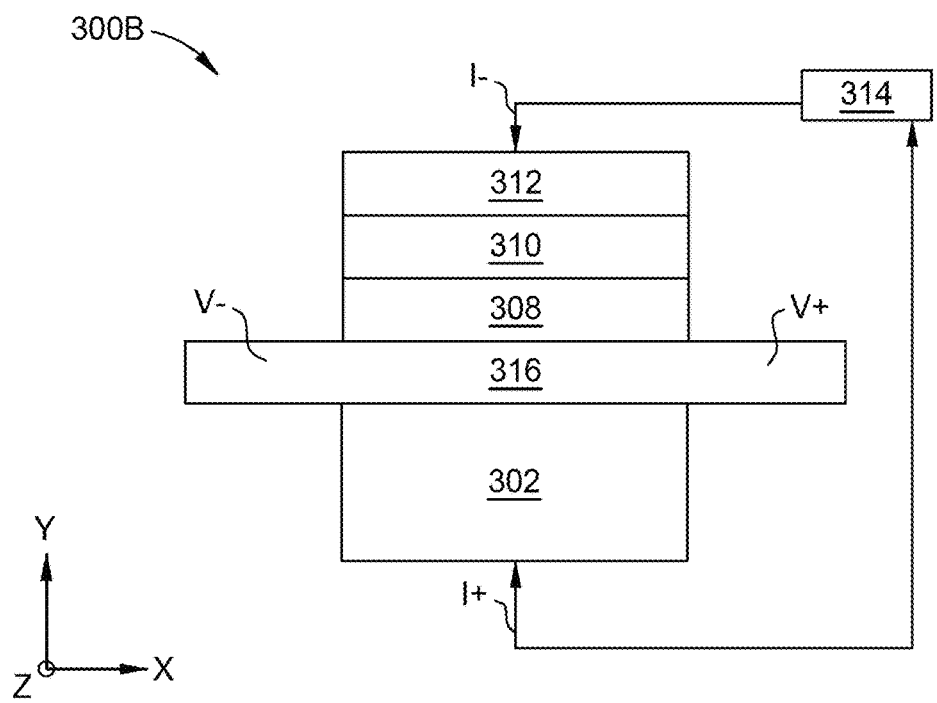
FIG. 3B illustrates a media facing surface view of a read head, according to one embodiment

FIG. 3A illustrates a media facing surface (MFS) view of a read head 300A, according to one embodiment. FIG. 3B illustrates a media facing surface (MFS) view of a read head 300B, according to one embodiment.

The read head 300A comprises a lead 302, a seed layer 304 disposed on the lead 302, a sensing layer 306 disposed on the seed layer 304, an optional interlayer 308 disposed on the sensing layer 306, a free layer 310 disposed on either the sensing layer 306 or the interlayer 308, and a cap layer 312 disposed on the free layer 310. In some embodiments, the sensing layer 306 is a SCC or CSC layer. SCC or CSC read heads generally comprise a seed layer (e.g., a crystalline seed layer), a sensing layer (e.g., a SCC or CSC layer), a free layer (e.g., a magnetic free layer), and a cap layer. The magnetic free layer, sensing layer (e.g., a SCC or CSC layer), and capping layer can be located between a first and second magnetic shield (not shown). The distance between the magnetic shields defines the gap spacing. In order to maximize data density it is desirable to make the gap spacing as small as possible. This is because a smaller gap spacing allows the sensor to read a magnetic signal with small bit length along data tracks, thereby allowing the sensor to read more bits per inch of data track.

The free layer 310 can be constructed of a magnetic material such as alloys of Ni, Fe, Co or a Heusler alloy. Such layers may also contain Boron. In some embodiments, the free layer 310 is a ferromagnetic layer. The thickness (i.e., a thickness in the y-direction) of free layer 310 is preferably thicker than spin diffusion length of free layer 310 in order to more completely polarize current and increase spin current injection into sensing layer 306. The free layer 310 may have a thickness in the y-direction of about 5 nanometers (nm) to about 20 nm, a length in the x-direction of about 5 nm to about 30 nm, and a width in the z-direction of about 5 nm to about 100 nm. The sensing layer 306 can be constructed of a non-magnetic metal, which may have large spin-orbital coupling. The sensing layer 306 may be constructed of a heavy metal (such as Ta, W, Pt, Hf, Bi, or alloys thereof), topological insulator (such as BiSb, BiSe), or Heusler alloy (such as YPtBi). The cap layer 312 can be formed of a material such as Ta, Ru, and/or Rh. The optional spacer layer can be constructed of a spin filter such as MgO and/or a diffusion barrier such as NiFeGe.

In a SCC read head, electrons flow from the free layer to the sensing layer. As electrons pass through the free layer, many of them align themselves according to the magnetization of the free layer. The magnetization of the free layer is influenced by external magnetic fields such as stray fields from a magnetic medium. As polarized electrons enter the sensing layer, voltage signals are generated in the transverse direction due to spin to charge conversion (SCC) via a mechanism such as, but not limited to, the inverse spin Hall effect, inverse orbital Hall effect, anomalous Nernst effect, or the anomalous Hall effect. By detecting the voltage signals, a SCC read head can determine the magnetization states of a magnetic medium and read the information.

Various sensing materials have been used for SCC and CSC read heads. Heavy metals such as Ta and W have previously been explored, but their signal levels were small due to their small SCC and CSC efficiency. The voltage signal resulting from SCC or CSC is proportional to the SCC or CSC efficiency. In contrast, topological insulators (TIs), e.g. BiSb and BiSe, exhibit SCC or CSC efficiencies two orders of magnitude higher than heavy metals. Although TIs have also been considered for SCC and CSC read heads, they suffer from poor thermal stability or are incompatible with the read head's process temperature. Additionally, epitaxial TIs require crystalline seed layers with significantly higher electrical conductivities than TI films. Consequently, most of the voltage signal generated by the sensing layer would be shunted by the highly conductive seed layers. To mitigate these side effects associated with both heavy metals and TIs, appropriate sensing materials are essential for SCC and CSC read heads.

For instance, BiSb has high SCC efficiency of up to 52. The thermal stability is not compatible with current read head processes due to high interdiffusion rates and low melting points, i.e., the melting temperature of BiSb is around 280° C. As a result, BiSb may dissolve into other layers during read head processing. BiSb films also need highly conductive crystalline seed layers to obtain good epitaxial textures and high SCC efficiency. Another challenge faced by BiSb is that most of the voltage signal is shunted through the seed layers. Though previously tested ex-situ seeds (e.g., patterned seeds) of BiSb films exhibit much higher signal compared to heavy metals, the thermal stability of these ex-situ seeds of BiSb films were even worse due to the lack of epitaxial growth.

Other examples of TI materials, such as BiSe, have additional challenges for read head applications. TI materials usually have much higher resistivities when compared with crystalline seed layers. The crystalline seed layers will lose most of the voltage signals due to the shunting from seed layers. Further, materials such as Se have high vapor pressure and could contaminate vacuum chambers, which are used in the fabrication of read heads.

Other materials suitable for the sensing layer for SCC or CSC read heads include half-Heusler alloys like YBiPt, which has thermal stability up to 600° C. and SCC and CSC efficiency up to 8 if it is grown on a single crystalline c-sapphire substrate. However, the SCC and CSC efficiency decreases significantly to about 0.7 if YBiPt films are directly deposited onto bare silicon (Si) wafers and to about 1.1 on Ta or $CrO_x$ seed layers. Moreover, substrates need to be kept at elevated temperatures greater than about 290° C.

during the deposition of YBiPt films. As YBiPt is a ternary alloy, it is more complicated to grow and precisely control the composition compared with binary films. Additionally, the resistivity of YBiPt is even higher than that of BiSb and more signal shunting from seed layers is expected.

When spin polarized electrons travel through the optional interlayer 308 between the free layer 310 and the sensing layer 306, there will be a spin current induced and injected into the sensing layer 306. Such a spin current can generate a voltage inside sensing layer 306 as a result of spin-to-charge conversion (SCC). This voltage will be oriented parallel to the plane defined by the interlayer 308 between the sensing layer 306 and the free layer 310. This voltage can be oriented in a direction that is perpendicular to the direction of flow of the current i from top to the bottom (i.e., a current-perpendicular-to-the-plane (CPP) device, as shown in FIGS. 3A, 3B, 5A, and 6A) and also perpendicular to the spin polarization direction of the magnetic free layer, or vice versa (i.e., a current-in-plane (CIP) device, as shown in FIGS. 5B and 6B).

As shown in FIG. 3B, read head 300B comprises a lead 302, a sensing layer 316 disposed on the lead 302, an optional interlayer 308 disposed on the sensing layer 316, a free layer 310 disposed on the interlayer 308, a cap layer 312 disposed on the free layer 310. In some embodiments, the sensing layer 316 is a spin-to-charge (SCC) or charge-to-spin (CSC) layer. In some embodiments, the sensing layer 316 comprises an amorphous material. In some embodiments, the amorphous material comprises a silicon-containing material. In some embodiments, the sensing layer 316 comprises Fe, the percentage composition of Fe in the sensing layer 316 is between about 20% and about 80%, such as between about 25% and about 60%, such as less than 80%, such as less than 70%, such as less than 60%, such as greater than 20%, such as greater than 25%. In some embodiments, the sensing layer 316 comprises Co, the percentage composition of Co in the sensing layer 316 is between about 50% and about 80%, such as between about 60% and about 70%, such as less than 80%, such as less than 70%, such as greater than 50%, such as greater than 60%. In some embodiments, the amorphous material has a crystallization temperature greater than 290° C. In some embodiments, the amorphous material is amorphous FeSi, amorphous CoSi, or a combination thereof. Amorphous FeSi and CoSi show adequate spin Hall efficiency (>150%) and can potentially generate large voltage signals as a result of, but not limited to, the inverse spin Hall effect, inverse orbital Hall effect, anomalous Nernst effect, or the anomalous Hall effect. In some embodiments, a thickness (i.e., a thickness in the y-direction) of the sensing layer 316 is less than 50 nm, such as less than 40 nm, such as greater than 1 nm, such as greater than 5 nm, such as between about 1 nm to about 50 nm, such as between about 5 nm to about 40 nm. It is to be understood that the term "about" utilized may refer to a range of plus or minus 5%. Further, since amorphous FeSi and CoSi does not need crystalline seed layers, signal shunting from the crystalline seed layers is eliminated. Still further, FeSi films are thermally stable up to 290° C., which is compatible with the current read head process.

Circuitry 314 can be provided to supply an electrical current i through read heads 300A, 300B that is oriented in a direction that is perpendicular to the planes of the layers 312, 310, 308, 306, 304, 302; or through layers 312, 310, 308, 316, 302 of read head 300B. Specifically, electrons travel from i- to i+. In other words, the circuitry applies the current i in a direction that is generally parallel with the direction of a data track to be read by the read head. The circuitry 314 provides one example of a means for generating a voltage (V+, V−) in a sensing layer (e.g., a SCC or CSC layer 306, 316) as a result of, but not limited to, the inverse spin Hall effect, inverse orbital Hall effect, anomalous Nernst effect, or the anomalous Hall effect. Because of the magnetization of the magnetic free layer 310, electrons traveling through the free layer 310 will become spin polarized. The orientation of spin polarization will be affected by the direction of the magnetization of the free layer 310. When the free layer 310 changes magnetization orientation in response to an external magnetic field, the orientation of the spin polarization will change as well.

Figure 4A:
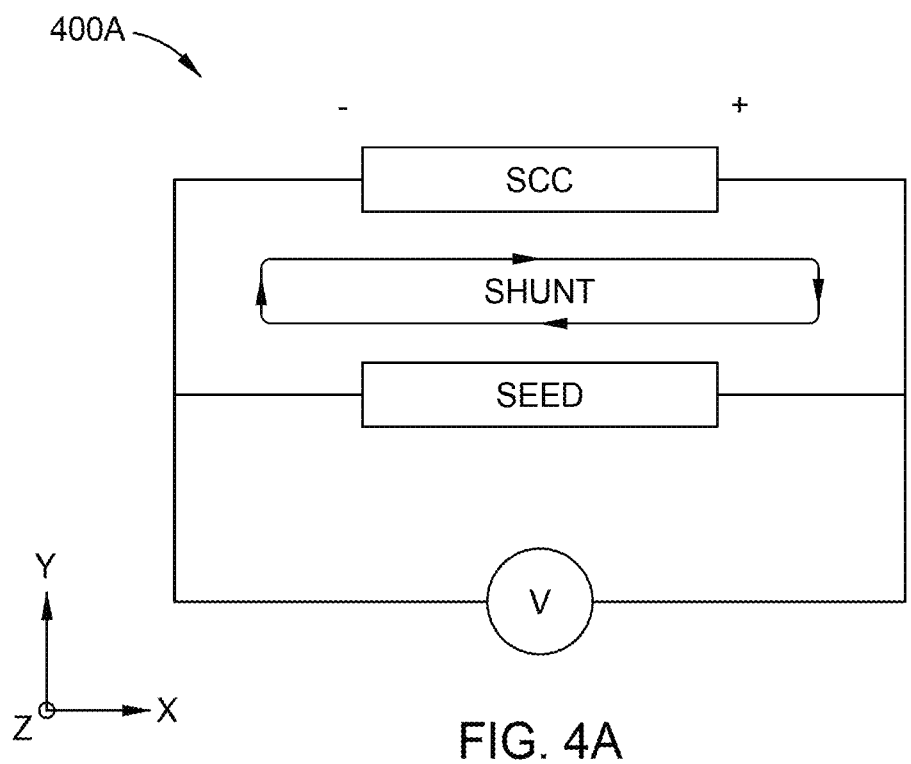
FIGS. 4A-4B illustrate a read head, according to another embodiment.
Figure 4B:
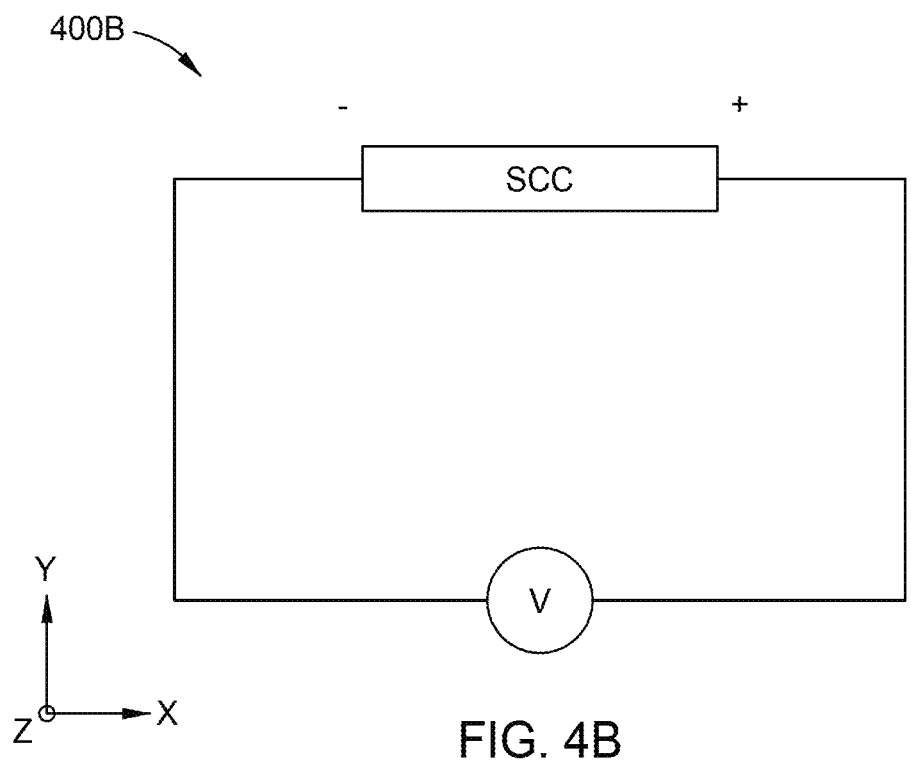

FIGS. 4A-4B illustrate a read head, according to another embodiment. FIG. 4A illustrates a side cross-sectional view of read head 400A, according to one embodiment. Read head 400A comprises a sensing layer (e.g., a SCC or CSC layer) disposed on a seed layer. The sensing layer of read head 400A comprises materials that require seed layers, such as epitaxial TI films or Heusler alloy films. Voltage signals of read head 400A are partially shunted due to conductive properties of seed layers, as the conductive properties provide an alternative path for the current and diverts the current, which in turn affects the effective resistance of the read head and decreases signal quality. FIG. 4B illustrates a side cross-sectional view of read head 400B, according to one embodiment. Read head 400B comprises a sensing layer (e.g. a SCC or CSC layer), the sensing layer comprises amorphous silicides such as FeSi and/or CoSi. Since sensing layers comprising amorphous FeSi or CoSi do not need a crystalline seed layer, the seed layer can be removed in read head 400B. The omission of a seed layer in read head 400B eliminates voltage signal shunting caused by seed layers in the read head, as seen in FIG. 4A.

Figure 5A:
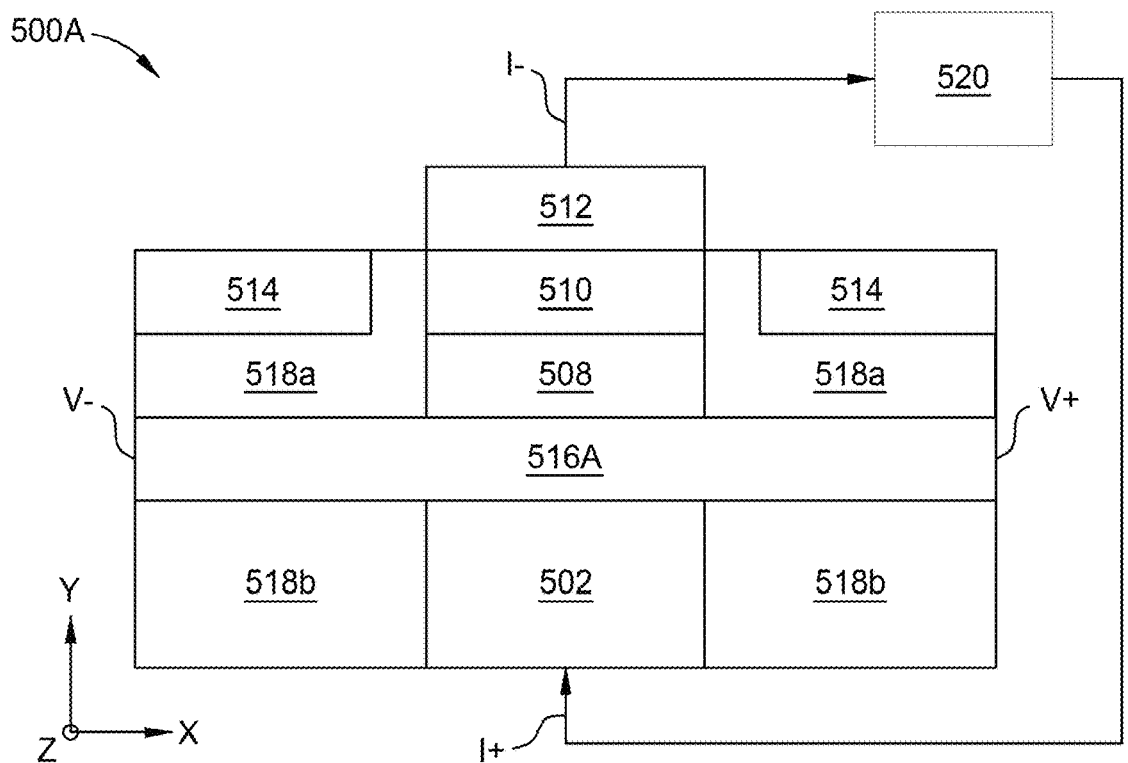
FIGS. 5A-5B illustrate a read head, according to another embodiment.
Figure 5B:
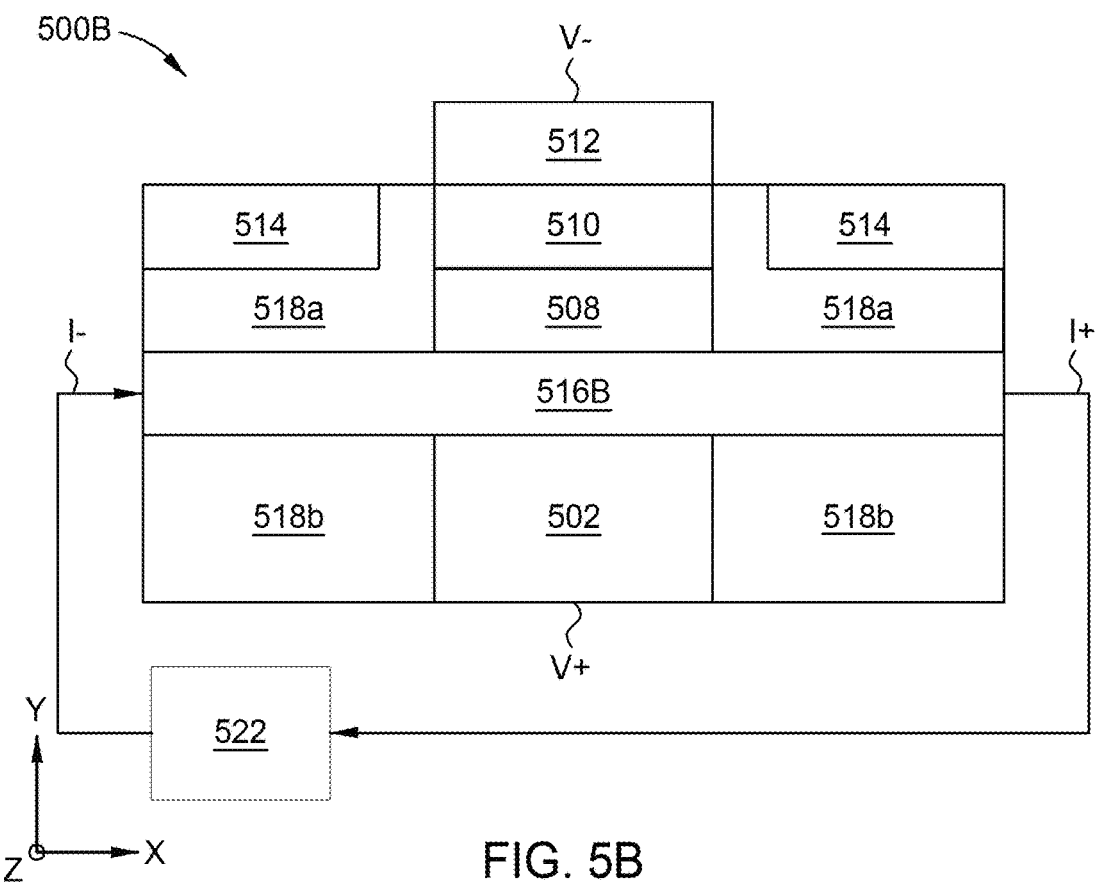

FIGS. 5A-5B illustrate a read head, according to another embodiment. FIG. 5A illustrates an MFS view of the read head 500A having a sensing layer bottom structure, and FIG. 5B illustrates an MFS view of the read head 500B having a sensing layer bottom structure.

Read head 500A comprises a lead 502, a sensing layer (e.g., a SCC or CSC layer) 516A disposed on the lead 502, an optional interlayer 508 disposed on the sensing layer 516A, a free layer 510 disposed on the interlayer 508 or the sensing layer 516A, and a cap layer 512 disposed on the free layer 510. In some embodiments, as shown in FIG. 5A, optional interlayer 508 may be patterned (i.e., the optional interlayer is the same width in the z-direction as the free layer 508 and cap layer 512). In some embodiments, optional interlayer 508 is not patterned (i.e., the optional interlayer is the same width in the z-direction as the sensing layer 516A). In some embodiments, the sensing layer 516A comprises an amorphous material. In some embodiments, the sensing layer 516A comprises a silicon-containing material. In some embodiments, the sensing layer 516A comprises amorphous FeSi, amorphous CoSi, or a combination thereof.

Circuitry 520 may correspond to circuitry 314 of FIG. 3B and can be provided to supply an electrical current i through read head 500A that is oriented in a direction that is perpendicular to the planes of the layers 502, 516A, 508, 510, and 512. The circuitry 520 provides one example of a means for generating a voltage in a sensing layer (e.g., a SCC or CSC layer) 516A as a result of, but not limited to, the inverse spin Hall effect, inverse orbital Hall effect, anomalous Nernst effect, or the anomalous Hall effect. However, other CSC or SCC effects may lead to such a voltage. Lead 502 may correspond to lead 302 of FIG. 3B, sensing layer 516A may correspond to sensing layer 316 of FIG. 3B, interlayer 508 may correspond to interlayer 308 of FIG. 3B, free layer 510 may correspond to free layer 310 of FIG. 3B, and cap layer 512 may correspond to cap layer 312 of FIG. 3B.

Side shields 514, which may be soft bias side shields, are disposed adjacent to the free magnetic layer 510 in both the x-direction and the −x-direction, where the side shields 514 are spaced from the free magnetic layer 510, interlayer 508, and sensing layer 516a by insulating layers 518a. In some embodiments, the insulating layer 518a and portions of the insulating layer 518b are one insulating layer. The insulating layer 518b may be partially disposed in contact with lead 502. The lead 502 may be at least partially vertically aligned with the side shields 514 in the y-direction, or in a direction parallel to the MFS. The insulating layers 518a and 518b may each individually comprise $AlO_x$, AlN, $TaO_x$, SiN, or $SiO_2$, where x is a numeral greater than 1. The side shields 514 may comprise magnetic materials, such as alloys of Ni, Fe, and Co.

Read head 500B comprises a lead 502, a sensing layer (e.g., a SCC or CSC layer) 516B disposed on the lead 502, an optional interlayer 508 disposed on the sensing layer 516B, a free layer 510 disposed on the interlayer 508 or on the sensing layer 516B, and a cap layer 512 disposed on the free layer 510. In some embodiments, the sensing layer 516B comprises an amorphous material. In some embodiments, the sensing layer 516B comprises a silicon-containing material. In some embodiments, the sensing layer 516B comprises amorphous FeSi, amorphous CoSi, or a combination thereof. Circuitry 522 can be provided to supply an electrical current i through read head 500B that is oriented in a direction that is parallel to the planes of the layers 502, 516B, 508, 510, and 512.

Read head 500B operates on CSC effect(s) such as the spin Hall effect, as opposed to the effect as shown in FIG. 5A. When the electrical current i flows through the sensing layer 516B, the spin Hall effect causes the spins of electrons in the sensing layer 516B to become polarized. Electrons predominantly of one spin will accumulate at a top side of sensing layer 516B, whereas electrons of an opposite spin will accumulate at a bottom side of sensing layer 516B. These electron spins are oriented perpendicular to the current flow i, and perpendicular to the page of FIG. 5B (i.e., in the +/−z-directions). It can be seen then that the magnetization of the free layer 510 is biased in a direction perpendicular to the direction of the spins of the sensing layer 516B adjacent to the free layer 510. Since the free layer 510 is adjacent to the sensing layer 516B, there is an optional interlayer 508 disposed between the free layer 510 and the sensing layer 516B. Due to the spin polarization of the electrons and magnetization of the free layer 510, a spin dependent electrical potential exists. This electrical potential varies in response to changes in the direction of magnetizations of the free layer 510 relative to the spin polarity of the electrons in the sensing layer 516B. The change in the voltage can be read as a signal indicating a change in a nearby magnetic field, such as from a magnetic media. Circuitry 522 provides one example of a means for generating a sensing layer (e.g., CSC or SCC layer) 516B because of a CSC effect(s) such as the spin Hall effect.

Figure 6A:
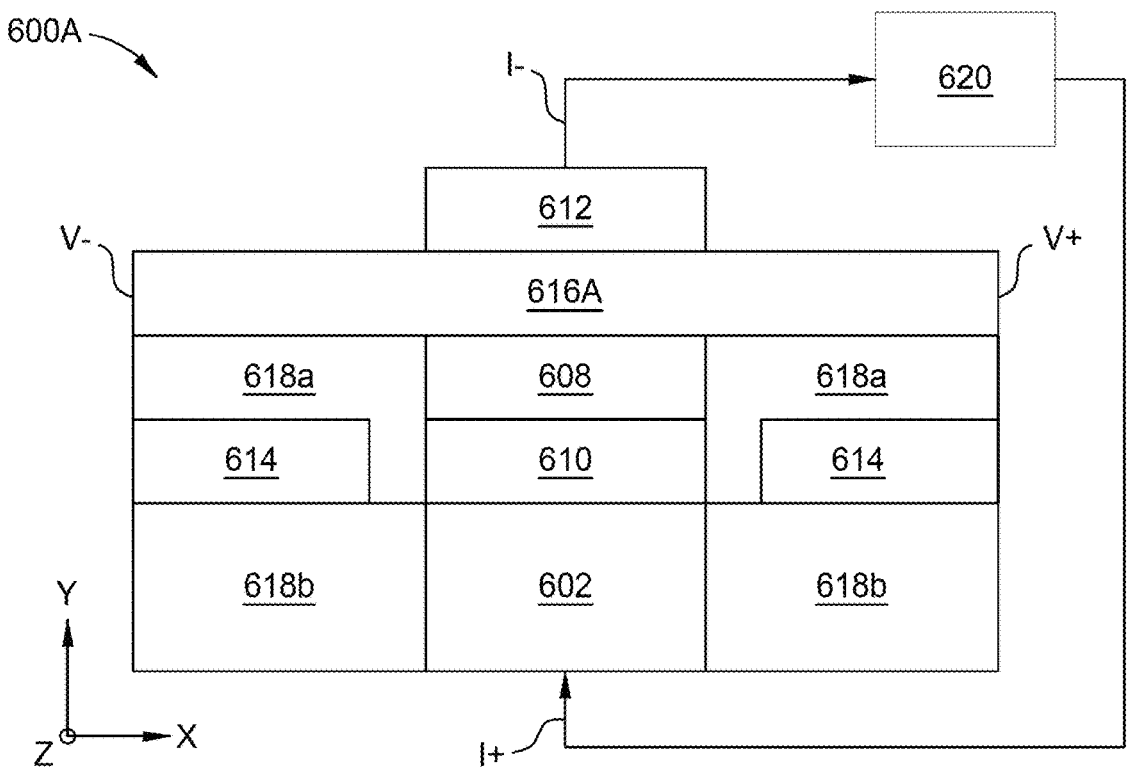
FIGS. 6A-6B illustrate a read head, according to another embodiment.
Figure 6B:
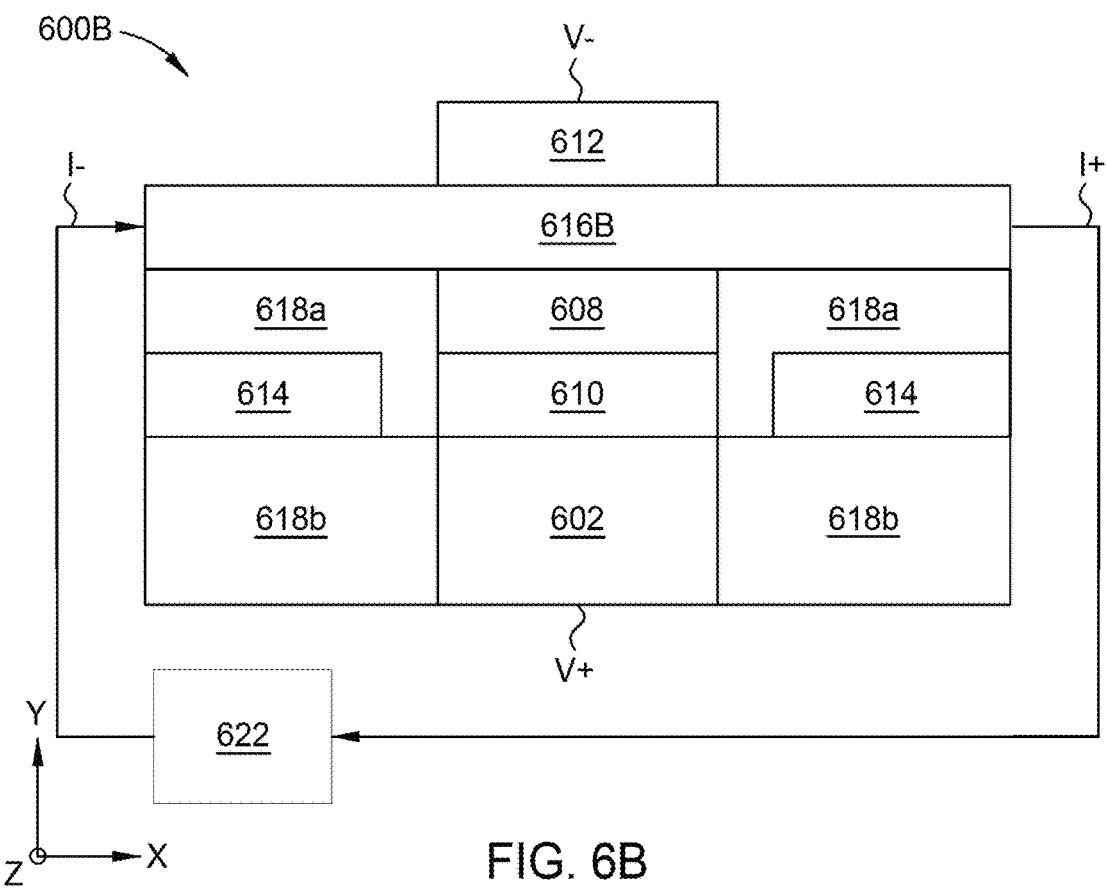

FIGS. 6A-6B illustrate a read head, according to another embodiment. FIG. 6A illustrates a MFS view of the read head 600A having a sensing layer top structure, and FIG. 6B illustrates an MFS view of the read head 600B having a sensing layer top structure.

Read head 600A comprises a lead 602, a free layer 610 disposed on the lead 602, an optional interlayer 608 disposed on the free layer 610, a sensing layer (e.g., a SCC or CSC layer) 616A disposed on the interlayer 608, and a cap layer 612 disposed on the sensing layer 616A. In some embodiments, the sensing layer 616A comprises an amorphous material. In some embodiments, the sensing layer 616A comprises a silicon-containing material. In some embodiments, the sensing layer 616A comprises amorphous FeSi, amorphous CoSi, or a combination thereof.

Circuitry 620 may correspond to circuitry 314 of FIG. 3B and can be provided to supply an electrical current i through read head 600A that is oriented in a direction that is perpendicular to the planes of the layers 602, 608, 610, 616A, and 612. The circuitry 620 provides one example of a means for generating a voltage in sensing layer 616A from spin-to-charge conversion mechanisms, as a result of, but not limited to, the inverse spin Hall effect, inverse orbital Hall effect, anomalous Nernst effect, or the anomalous Hall effect. Lead 602 is an implementation of and may correspond to lead 302 of FIG. 3B, sensing layer 616A is an implementation of and may correspond to sensing layer 316 of FIG. 3B, interlayer 608 is an implementation of and may correspond to interlayer 308 of FIG. 3B, free layer 610 is an implementation of and may correspond to free layer 310 of FIG. 3B, and cap layer 612 is an implementation of and may correspond to cap layer 312 of FIG. 3B.

Side shields 614, which may be soft bias side shields, are disposed adjacent to the free magnetic layer 610 in both the x-direction and the −x-direction, where the side shields 614 are spaced from the free magnetic layer 610 and the optional interlayer 608 by insulating layers 618a. In some embodiments, side shields 614 may be stabilized using antiferromagnetic coupling to a layer disposed below (e.g., in the −y-direction) side shields 614 (not shown). In some embodiments, the stabilizing layer disposed below side shields 614 is embedded in insulating layer 618b. In some embodiments, the insulating layer 618a and portions of the insulating layer 618b are one insulating layer. The insulating layer 618b may be partially disposed in contact with lead 602. The lead 602 may be at least partially vertically aligned with the side shields 614 in the y-direction, or in a direction parallel to the MFS. The insulating layers 618a and 618b may each individually comprise $AlO_x$, AlN, $TaO_x$, SiN, $SiO_2$, or a combination thereof, where x is a numeral greater than 1. In some embodiments, insulating layer 618a and 618b may comprise $AlO_x$, AlN, $TaO_x$, SiN, $SiO_2$, or a combination thereof capped with one or more of $AlO_x$, AlN, $TaO_x$, SiN, $SiO_2$. The side shields 614 may comprise magnetic materials, such as alloys of Ni, Fe, and Co. It is to be noted, in some embodiments, a shield (referred to as "S2") (not shown) is disposed on read head 600A (i.e., over cap layer 612). In these embodiments, sensing layer 616A requires electrical isolation from the shield; as a result, an insulator refill is needed when the cap layer 612 is formed.

Read head 600B comprises a lead 602, a free layer 610 disposed on the lead 602, an optional interlayer 608 disposed on the free layer 610, a sensing layer 616B disposed on the interlayer 608, and a cap layer 612 disposed on the sensing layer 616B. In some embodiments, the sensing layer 616B comprises an amorphous material. In some embodiments, the sensing layer 616B comprises a silicon-containing material. In some embodiments, the sensing layer 616B comprises amorphous FeSi, amorphous CoSi, or a combination thereof. Circuitry 622 can be provided to supply an electrical current i through read head 600B that is oriented in a direction that is parallel to the planes of the layers 602, 616B, 608, 610, and 612.

Read head 600B operates based on charge to spin conversion, as opposed to spin to charge conversion as shown in FIG. 6A. For example, in an embodiment that uses the spin Hall effect, when the electrical current i flows through the sensing layer 616B, the charge to spin conversion like the spin Hall effect causes the spins of electrons in the sensing layer 616B to become polarized. Electrons predominantly of one spin will accumulate at a top side of sensing layer 616B, whereas electrons of an opposite spin will accumulate at a bottom side of sensing layer 616B. These electron spins are oriented perpendicular to the current flow i, and perpendicular to the page of FIG. 6B (i.e., in the +/−z-directions). It can be seen then that the magnetization of the free layer 610 is biased in a direction perpendicular to the direction of the spins of the non-magnetic layer adjacent to the free layer 610. Since the optional interlayer 608 is adjacent to the sensing layer 616B, there could be an interlayer 608 disposed between the free layer 610 and the sensing layer 616B. Due to the spin polarization of the electrons and magnetization of the free layer 610, a spin dependent electrical potential exists. This electrical potential varies in response to changes in the direction of magnetization of the free layer 610 relative to the spin polarity of the electrons in the sensing layer 616B. The change in the voltage can be read as a signal indicating a change in a nearby magnetic field, such as from a magnetic media. Circuitry 622 provides one example of a means for generating a voltage in a sensing layer (e.g., SCC or CSC layer) 616B because of the charge-to-spin conversion like the spin Hall effect.

It is noted that while FIGS. 3A-6B describe various read head embodiments, the configuration shown can be used in other applications such as magnetic sensor (apart from a magnetic recording device) and magnetic memory. For example, these embodiments could be implemented as a part of a sensor device, or part of a memory cell in a magnetic memory array, such as a spin orbit torque (SOT) magnetic random access memory (MRAM). In the case of the magnetic memory array, the free layer would serve as a recording layer, recording a bit of data using its magnetic direction. The above described sensing mechanisms would be used to sense such a magnetic direction, as part of reading back the data bit within the memory cell. Certain shields and insulating layers in FIGS. 5A-6B may be omitted in the magnetic memory or sensor applications, and in the case of the memory cell, additional circuitry may be implemented for using the sensing layer as part of writing to the free layer via the above described effects.

Unlike other material candidates (e.g., BiSb, YBiPt), amorphous sensing layers do not require crystalline seed layers for growth and still exhibit adequate spin Hall angles. Since seed layers are no longer needed for growth, signal shunting from seed layers is eliminated and read heads having sensing layer bottom and sensing layer top structures may be more easily designed. Furthermore, FeSi and CoSi have increased thermal stability over many materials with spin to charge conversion. Accordingly, sensing layers comprising FeSi or CoSi are better suited to survive the annealing process of read heads. Thus, the use of FeSi or CoSi in the sensing layer, results in a better performing, customizable, thermally stable read head.

In one embodiment, a magnetic device includes a lead; a sensing layer disposed over the lead, wherein the sensing layer comprises a silicon-containing amorphous material; a free layer; and a cap layer, wherein the free layer is disposed between the sensing layer and the cap layer.

A first side shield disposed adjacent to the free layer; and a second side shield disposed adjacent to the free layer, and circuitry coupled to the sensing layer for supplying a current through the sensing layer. The silicon-containing amorphous material is FeSi, CoSi, or a combination thereof. The sensing layer has a charge-to-spin efficiency greater than about 150%. The silicon-containing amorphous material has a crystallization temperature exceeding 290° C. The magnetic device is a current-perpendicular-to-the-plane (CPP) spin-to-charge, four terminal device, and wherein a voltage signal generated by the sensing layer is via inverse spin Hall effect, inverse orbital Hall effect, anomalous Nernst effect, or anomalous Hall effect. The magnetic device is a current-in-plane (CIP) charge-to-spin, four terminal device, and wherein a voltage signal generated by the sensing layer is via direct spin Hall effect. A magnetic recording device comprising a read head comprising the magnetic device. A first set of insulating layers surrounding the lead, and a second set of insulating layers surrounding the free layer. A sensor comprising the magnetic device. A magnetic memory comprising a memory cell comprising the magnetic device.

In another embodiment, a magnetic device includes a lead; a free layer disposed on the lead; a sensing layer, the sensing layer comprises a silicon-containing amorphous material, and the magnetic device is either: a current-perpendicular-to-the-plane (CPP) spin-to-charge device, wherein a voltage signal generated by the sensing layer, or a current-in-plane (CIP) charge-to-spin device, wherein a voltage signal generated by the sensing layer; and a cap layer, wherein the sensing layer is disposed between the free layer and the cap layer.

Circuitry coupled to the sensing layer for supplying a current through the sensing layer. The amorphous silicon-containing material is FeSi, CoSi, or a combination thereof. The amorphous silicon-containing material comprises between about 25% and about 60% Fe by percent composition. A thickness of the sensing layer is between about 5 nanometers (nm) and 40 nm. A magnetic recording device comprising a read head comprising the magnetic device. A first set of insulating layers surrounding the lead, a second set of insulating layers surrounding the free layer. A sensor comprising the magnetic device. A magnetic memory comprising a memory cell comprising the magnetic device.

In yet another embodiment, a magnetic recording device includes means for reading data disposed at a media facing surface (MFS), the means for reading data comprising: a lead; a sensing layer disposed over the lead, wherein the sensing layer comprises amorphous FeSi, amorphous CoSi, or a combination thereof, has a thickness between 5 nanometers (nm) and 40 nm; and a ferromagnetic layer disposed between the sensing layer and a cap layer, wherein the cap layer is disposed over the ferromagnetic layer; and means for generating a voltage.

The means for generating a voltage further includes a positive voltage lead connected to the sensing layer; a negative voltage lead connected to the sensing layer; a positive current lead connected to the lead; and a negative current lead connected to the cap layer, wherein the positive and negative current leads are aligned to provide a current path in a direction that is perpendicular to a plane of the sensing layer. The means for generating a voltage further includes a positive voltage lead connected to the lead; a negative voltage lead connected to the cap layer; a positive current lead connected to the sensing layer; and a negative current lead connected to the sensing layer, wherein the positive and negative current leads are aligned to provide a current path in a direction that is parallel to a plane of the sensing layer. The means for reading data further includes a first soft bias side shield disposed adjacent to the ferromagnetic layer at the MFS; and a second soft bias side shield disposed adjacent to the ferromagnetic layer at the MFS. The means for reading data further includes a first set of insulating layers surrounding the lead, and a second set of insulating layers surrounding the ferromagnetic layer.

While the foregoing is directed to embodiments of the present disclosure, other and further embodiments of the disclosure may be devised without departing from the basic scope thereof, and the scope thereof is determined by the claims that follow.

What is claimed is:

1. A magnetic device, comprising:
a lead;
a sensing layer disposed over the lead, wherein the sensing layer comprises a silicon-containing amorphous material;
a free layer; and
a cap layer, wherein the free layer is disposed between the sensing layer and the cap layer, wherein the magnetic device is a current-perpendicular-to-the-plane (CPP) spin-to-charge, four terminal device, and wherein a voltage signal generated by the sensing layer is via inverse spin Hall effect, inverse orbital Hall effect, anomalous Nernst effect, or anomalous Hall effect.

2. The magnetic device of claim 1, further comprising:
a first side shield disposed adjacent to the free layer; and
a second side shield disposed adjacent to the free layer, and
circuitry coupled to the sensing layer for supplying a current through the sensing layer.

3. The magnetic device of claim 1, wherein the silicon-containing amorphous material is FeSi, CoSi, or a combination thereof.

4. The magnetic device of claim 1, wherein the sensing layer has a charge-to-spin efficiency greater than about 150%.

5. The magnetic device of claim 1, wherein the silicon-containing amorphous material has a crystallization temperature exceeding 290° C.

6. A magnetic device, comprising:
a lead;
a sensing layer disposed over the lead, wherein the sensing layer comprises a silicon-containing amorphous material;
a free layer; and
a cap layer, wherein the free layer is disposed between the sensing layer and the cap layer, wherein the magnetic device is a current-in-plane (CIP) charge-to-spin, four terminal device, and wherein a voltage signal generated by the sensing layer is via direct spin Hall effect.

7. A magnetic recording device, comprising:
a read head, comprising:
a magnetic device, comprising:
a lead;
a sensing layer disposed over the lead, wherein the sensing layer comprises a silicon-containing amorphous material;
a free layer; and
a cap layer, wherein the free layer is disposed between the sensing layer and the cap layer; and
a first set of insulating layers surrounding the lead, and a second set of insulating layers surrounding the free layer.

8. A sensor comprising the magnetic device of claim 1.

9. A magnetic memory comprising a memory cell comprising the magnetic device of claim 1.

10. A magnetic device, comprising:
a lead;
a free layer disposed on the lead;
a sensing layer, the sensing layer comprises a silicon-containing amorphous material, wherein a thickness of the sensing layer is between about 5 nanometers (nm) and 40 nm, and the magnetic device is either:
a current-perpendicular-to-the-plane (CPP) spin-to-charge device, wherein a voltage signal generated by the sensing layer, or
a current-in-plane (CIP) charge-to-spin device, wherein a voltage signal generated by the sensing layer; and
a cap layer, wherein the sensing layer is disposed between the free layer and the cap layer.

11. The magnetic device of claim 10, wherein the magnetic device further comprises circuitry coupled to the sensing layer for supplying a current through the sensing layer.

12. The magnetic device of claim 10, wherein the silicon-containing amorphous material is FeSi, CoSi, or a combination thereof.

13. The magnetic device of claim 12, wherein the silicon-containing amorphous material comprises between about 25% and about 60% Fe by percent composition.

14. A magnetic recording device comprising a read head comprising the magnetic device of claim 10.

15. The magnetic recording device of claim 14, further comprising a first set of insulating layers surrounding the lead, a second set of insulating layers surrounding the free layer.

16. A sensor comprising the magnetic device of claim 10.

17. A magnetic memory comprising a memory cell comprising the magnetic device of claim 10.

18. A magnetic recording device, comprising:
means for reading data disposed at a media facing surface (MFS), the means for reading data comprising:
a lead;
a sensing layer disposed over the lead, wherein the sensing layer comprises amorphous FeSi, amorphous CoSi, or a combination thereof, has a thickness between 5 nanometers (nm) and 40 nm; and
a ferromagnetic layer disposed between the sensing layer and a cap layer, wherein the cap layer is disposed over the ferromagnetic layer; and
means for generating a voltage.

19. The magnetic recording device of claim 18, wherein the means for generating a voltage further comprises:
a positive voltage lead connected to the sensing layer;
a negative voltage lead connected to the sensing layer;
a positive current lead connected to the lead; and
a negative current lead connected to the cap layer, wherein the positive current lead and the negative current lead are aligned to provide a current path in a direction that is perpendicular to a plane of the sensing layer.

20. The magnetic recording device of claim 18, wherein the means for generating a voltage further comprises:
a positive voltage lead connected to the lead;
a negative voltage lead connected to the cap layer;
a positive current lead connected to the sensing layer; and
a negative current lead connected to the sensing layer, wherein the positive current lead and the negative current lead are aligned to provide a current path in a direction that is parallel to a plane of the sensing layer.

21. The magnetic recording device of claim 18, wherein the means for reading data further comprises:
   a first soft bias side shield disposed adjacent to the ferromagnetic layer at the MFS; and
   a second soft bias side shield disposed adjacent to the ferromagnetic layer at the MFS.

22. The magnetic recording device of claim 18, wherein the means for reading data further comprises a first set of insulating layers surrounding the lead, and a second set of insulating layers surrounding the ferromagnetic layer.

23. The magnetic device of claim 1, wherein a thickness of the sensing layer is between about 5 nanometers (nm) and 40 nm.

24. The magnetic device of claim 1, wherein the silicon-containing amorphous material comprises between about 25% and about 60% Fe by percent composition.

25. The magnetic device of claim 10, wherein the silicon-containing amorphous material has a crystallization temperature exceeding 290° C.

\* \* \* \* \*